(12) United States Patent
Kuwano

(10) Patent No.: US 10,836,218 B2
(45) Date of Patent: Nov. 17, 2020

(54) PNEUMATIC TIRE

(71) Applicant: TOYO TIRE & RUBBER CO., LTD., Osaka (JP)

(72) Inventor: Shingo Kuwano, Osaka (JP)

(73) Assignee: TOYO TIRE CORPORATION, Itami (JP)

( * ) Notice: Subject to any disclaimer, the term of this patent is extended or adjusted under 35 U.S.C. 154(b) by 853 days.

(21) Appl. No.: 15/496,280

(22) Filed: Apr. 25, 2017

(65) Prior Publication Data

US 2018/0065421 A1    Mar. 8, 2018

(30) Foreign Application Priority Data

Sep. 7, 2016   (JP) ................................. 2016-174748

(51) Int. Cl.
  *B60C 13/02*     (2006.01)
  *B60C 11/01*     (2006.01)
(52) U.S. Cl.
  CPC .............. *B60C 13/02* (2013.01); *B60C 11/01* (2013.01)
(58) Field of Classification Search
  CPC . B60C 11/01; B60C 11/032; B60C 2011/013; B60C 13/002; B60C 13/02
  See application file for complete search history.

(56) References Cited

U.S. PATENT DOCUMENTS

| | | | | |
|---|---|---|---|---|
| 4,265,287 A | * | 5/1981 | Abe ........................ | B60C 11/01 |
| | | | | 152/209.13 |
| 6,533,007 B1 | | 3/2003 | McMannis | |
| 2010/0288409 A1 | * | 11/2010 | Ohara ..................... | B60C 11/01 |
| | | | | 152/209.11 |

FOREIGN PATENT DOCUMENTS

JP       2010-264962 A     11/2010

OTHER PUBLICATIONS

Office Action dated Jun. 24, 2020, issued in counterpart JP application No. 2016-174748, with English translation. (6 pages).

* cited by examiner

*Primary Examiner* — Robert C Dye
(74) *Attorney, Agent, or Firm* — Westerman, Hattori, Daniels & Adrian, LLP

(57) ABSTRACT

In a pneumatic tire, a sidewall portion includes a plurality of projecting portions projecting in a tire width-direction. The projecting portions are placed such that at least portions of the projecting portions are superposed on a first block in a tire radial-direction as viewed in the tire width-direction. At least one of the projecting portions includes an opening which is separated from at least one of end edges of the projecting portions in the tire radial-direction. The opening includes a radial bottom curved surface having an arc cross section extending along the tire radial-direction. A radius of curvature of the radial bottom curved surface is equal to or greater than a maximum depth size of the opening.

15 Claims, 8 Drawing Sheets

PNEUMATIC TIRE

CROSS REFERENCE TO RELATED APPLICATIONS

This application claims the benefit of priority of Japanese application no. 2016-174748, filed on Sep. 7, 2016, which is incorporated herein by reference.

BACKGROUND OF THE INVENTION

Field of the Invention

The present invention relates to a pneumatic tire having a plurality of projecting portions which project in a tire width-direction.

Description of the Related Art

There are conventionally known pneumatic tires each having a plurality of projecting portions which project in a tire width-direction (e.g., JP-A-2010-264962). According to a structure of this pneumatic tire, traction performance on a mud area or a rocky area is enhanced due to resistance caused when the projecting portions shear dirt and due to friction between the projecting portions and rock, and resistance to external damage is enhanced due to increase in rubber thickness.

By the way, weight balance of the tire is prone to become uneven due to existence of the projecting portions. Accordingly, when the tire is produced (vulcanized), rubber does not smoothly flow, the tire may be chipped (bare may be generated) with respect to a desired tire shape, or uniformity may be lowered and this may cause vibration or noise of a vehicle.

SUMMARY OF INVENTION

It is an object of the present invention to provide a pneumatic tire capable of suppressing unevenness of weight balance.

There is provided a pneumatic tire, which includes:
a sidewall portion extending in a tire radial-direction; and
a tread portion having a tread surface on outer side in the tire radial-direction and connected to an outer end of the sidewall portion in the tire radial-direction, wherein
the tread portion includes a plurality of grooves extending to an outer end in a tire width-direction, and a plurality of blocks arranged in a tire circumferential-direction by being defined the blocks by the plurality of grooves,
the plurality of blocks includes a plurality of first blocks and a plurality of second blocks, outer end edges of the second blocks on the tread surface in the tire width-direction being located on an inner side in the tire width-direction than outer end edges of the first blocks on the tread surface in the tire width-direction due to recesses provided at outer ends of the second blocks in the tire width-direction,
the sidewall portion includes a plurality of projecting portions projecting in the tire width-direction,
the projecting portions are placed such that at least portions of the projecting portions are superposed on the first block in the tire radial-direction as viewed in the tire width-direction,
at least one of the projecting portions includes an opening which is separated from at least one of end edges of the projecting portions in the tire radial-direction,
the opening includes a radial bottom curved surface having an arc cross section extending along the tire radial-direction, and
a radius of curvature of the radial bottom curved surface is equal to or greater than a maximum depth size of the opening.

Also, the pneumatic tire may have a configuration in which:
the opening is separated from at least one of the end edges in the tire circumferential-direction,
the opening includes a circumferential bottom curved surface having an arc cross section extending along the tire circumferential-direction, and
a radius of curvature of the circumferential bottom curved surface is equal to or greater than the maximum depth size of the opening.

Also, the pneumatic tire may have a configuration in which:
the radius of curvature of the radial bottom curved surface is greater than that of the circumferential bottom curved surface.

Also, the pneumatic tire may have a configuration in which:
the opening includes a radial side flat surface which is placed between the end edge of the opening of the tire radial-direction and the radial bottom curved surface and which is formed into a flat surface, and a circumferential side flat surface which is placed between the end edge of the opening in the tire circumferential-direction and the circumferential bottom curved surface and which is formed into the flat surface, and
an angle formed between the radial side flat surface and a surface of the projecting portion is greater than an angle formed between the circumferential side flat surface and the surface of the projecting portion.

Also, the pneumatic tire may have further a bead portion placed on an inner side of the sidewall portion of the tire radial-direction, wherein
the bead portion includes a bead core placed on an inner side,
the tread portion includes a tread rubber placed on an outer side in the tire radial-direction, and a belt portion placed on an inner side of the tread rubber in the tire radial-direction,
the opening is separated from both end edges of the projecting portion in the tire radial-direction, thereby including the pair of radial bottom curved surface, and
a radius of curvature of one of the pair of radial bottom curved surfaces which is close to the central position between an outer end of the bead core in the tire radial-direction and an inner end of the belt portion in the tire radial-direction is greater than that of the other one of the pair of radial bottom curved surfaces which is far from the central position.

Also, the pneumatic tire may have a configuration in which:
the radius of curvature of the radial bottom curved surface is 100% to 200% of the maximum depth size of the opening.

Also, the pneumatic tire may have a configuration in which:
the radius of curvature of the radial bottom curved surface is 100% to 175% of the maximum depth size of the opening.

Also, the pneumatic tire may have a configuration in which:
a radius of curvature of the radial bottom curved surface is equal to or smaller than the maximum projecting amount of the projecting portion.

Also, the pneumatic tire may have a configuration in which:

a radius of curvature of the circumferential bottom curved surface is 100% to 150% of the maximum depth size of the opening.

Also, the pneumatic tire may have a configuration in which:

a radius of curvature of the circumferential bottom curved surface is 110% to 140% of the maximum depth size of the opening.

Also, the pneumatic tire may have a configuration in which:

the radius of curvature of the circumferential bottom curved surface is equal to or smaller than the maximum projecting amount of the projecting portion.

Also, the pneumatic tire may have a configuration in which:

the radius of curvature of the radial bottom curved surface is 200% to 350% of the radius of curvature of the circumferential bottom curved surface.

Also, the pneumatic tire may have a configuration in which:

the radius of curvature of the radial bottom curved surface is 250% to 300% of the radius of curvature of the circumferential bottom curved surface.

Also, the pneumatic tire may have a configuration in which:

an angle formed between the radial side flat surface and a surface of the projecting portion is 90° to 135°, and an angle formed between the circumferential side flat surface and a surface of the projecting portion is 90° to 105°.

Also, the pneumatic tire may have a configuration in which:

a radius of curvature of one of the radial bottom curved surfaces which is close to the central position is 150% to 200% of that of the other radial bottom curved surface which is far from the central position.

Also, the pneumatic tire may have a configuration in which:

the opening includes a pair of radial side flat surfaces placed between the end edge of the opening in the tire radial-direction and the radial bottom curved surface, and an angle formed between the angle of the surface of the projecting portion and one of the pair of radial side flat surfaces which is close to the central position is equal to or greater than an angle formed between the surface of the projecting portion and the other one of the radial side flat surfaces which is far from the central position.

Also, the pneumatic tire may have a configuration in which:

an angle formed between the surface of the projecting portion and one of the pair of radial side flat surfaces which is close to the central position is 100% to 125% of an angle formed between the surface of the projecting portion and the other one of the radial side flat surfaces which is far from the central position.

DETAILED DESCRIPTION OF THE PREFERRED EMBODIMENTS

An embodiment of a pneumatic tire will be described below with reference to FIGS. 1 to 7. Size ratios in each of the drawings (including FIGS. 8 and 9) do not always match with actual size ratios, and size ratios between the drawings do not always math with each other.

Figure 1:
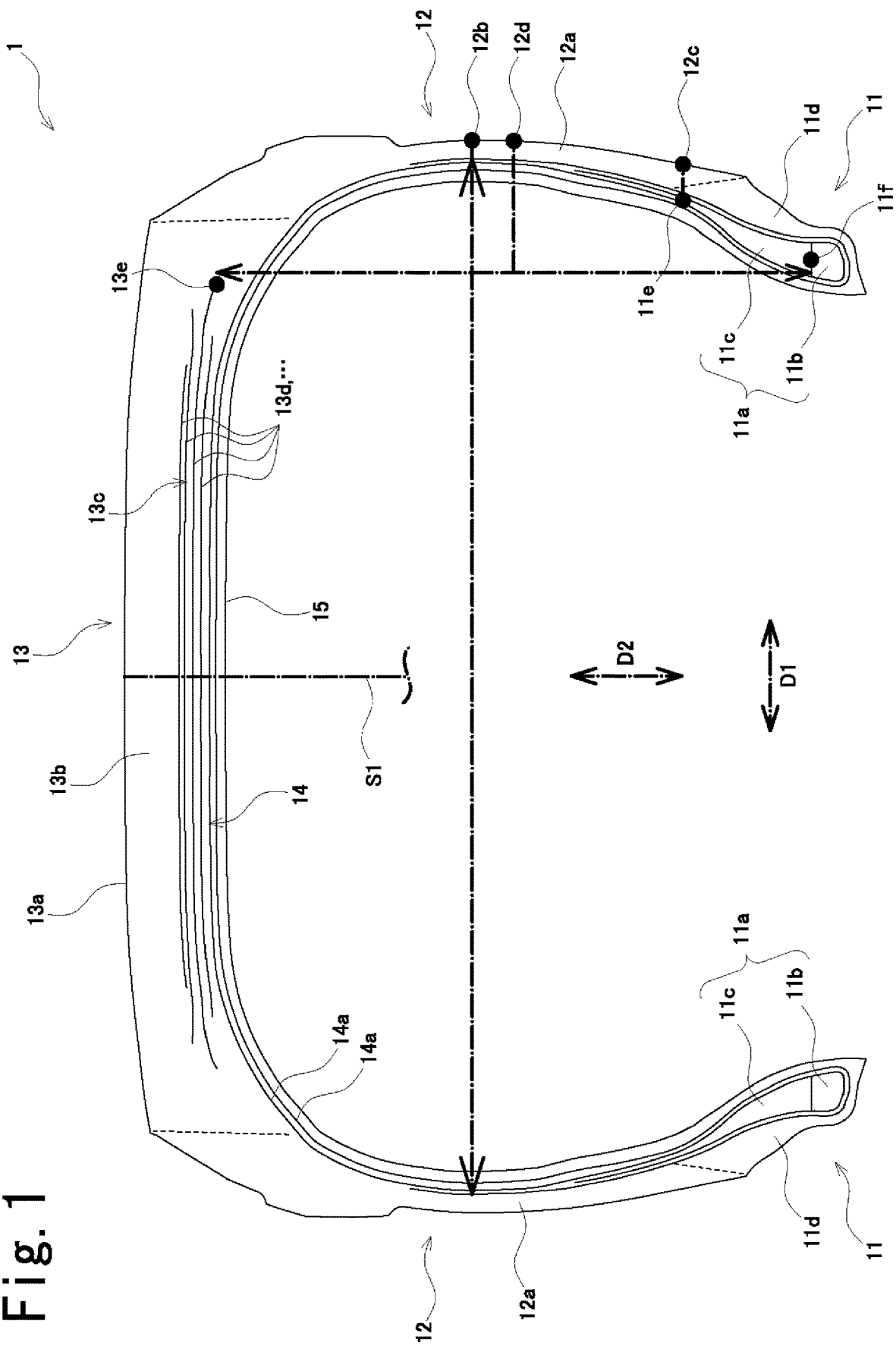
FIG. 1 is a sectional view of essential portions in a tire meridional surface of a pneumatic tire according to an embodiment.
Figure 2:
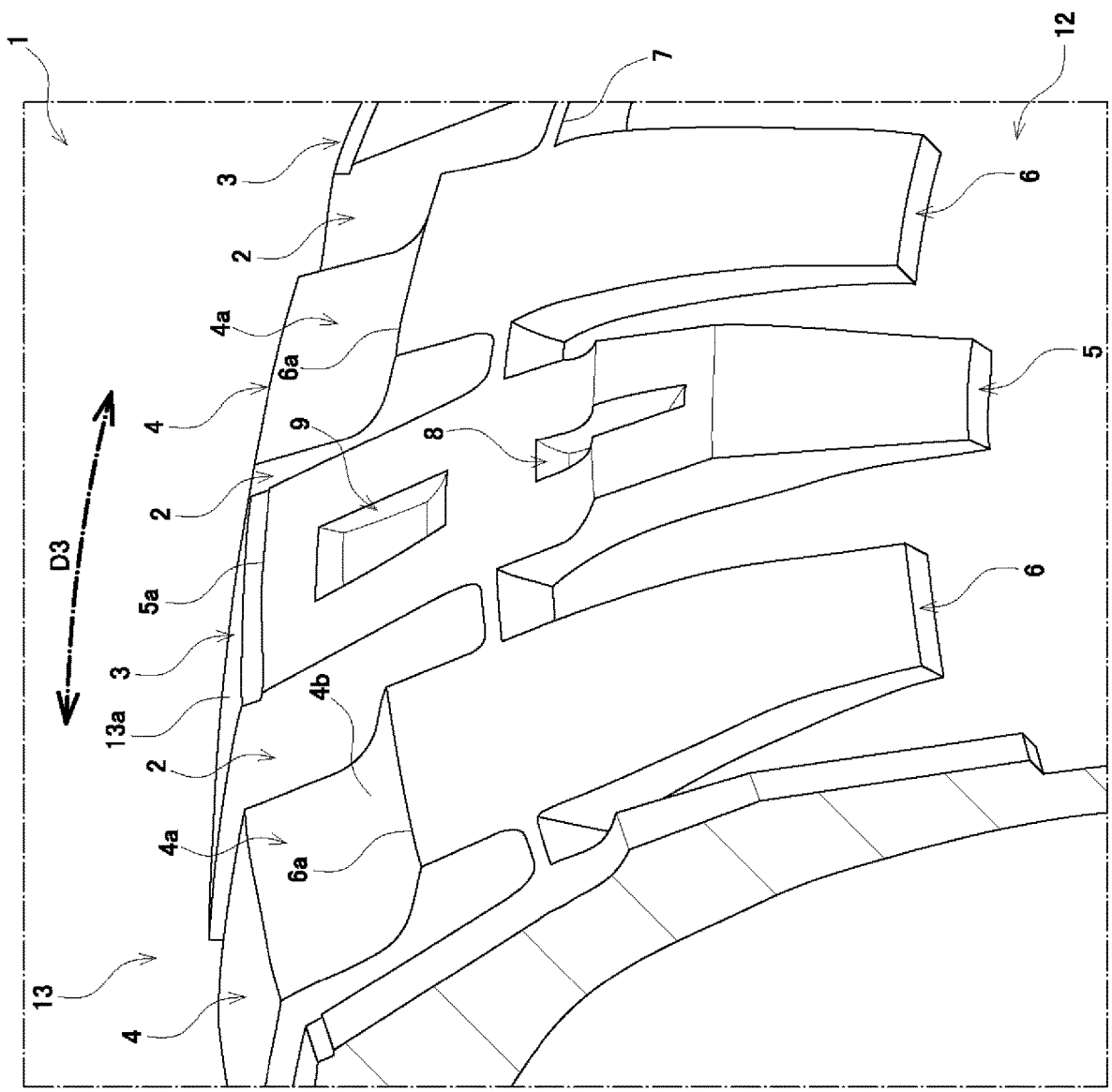
FIG. 2 is a perspective view of essential portions of the pneumatic tire of the embodiment.

As shown in FIG. 1, the pneumatic tire (also called "tire" simply) 1 includes a pair of bead portions 11 having beads 11a. The tire 1 includes sidewall portions 12 extending from the bead portions 11 radially outward in a tire radial-direction D2, and a tread portion 13 which is connected to outer ends of the pair of sidewall portions 12 in the tire-radial direction D2. The tread portion 13 is provided with a tread surface 13a which comes into contact with ground. The tread surface 13a is located on the outer side of in a tire radial-direction D2. The tire 1 is mounted on a rim (not shown).

The tire 1 includes a carcass layer 14 extending between the pair of beads 11a and 11a, and an inner linear 15 located on an inner side of the carcass layer 14 and facing an inner space of the tire 1 into which air is charged. The carcass layer 14 and the inner linear 15 are placed along an inner periphery of the tire over the bead portions 11, the sidewall portions 12 and the tread portion 13.

In FIG. 1 (also in the other drawings), a first direction D1 is a tire width-direction D1 which is parallel to the tire rotation axis, a second direction D2 is the tire radial-direction D2 which is a diameter direction of the tire 1, and a third direction D3 (see FIGS. 2 and 3, for example) is a tire circumferential-direction D3 which is a direction around a tire axial-direction. A tire equator surface S1 is a surface intersecting with the tire rotation axis at right angle, and is located on a center of the tire width-direction D1, and a tire meridional surface is a surface including a surface including the tire rotation axis, and intersecting with the tire equator surface S1.

Each of the beads 11a includes an annularly formed bead core 11b, and a bead filler 11c placed on an outer side of the bead core 11b in the tire radial-direction D2. For example, the bead core 11b is formed by laminating rubber-coated bead wires (metal wires, for example), and the bead filler 11c is formed by forming hard rubber outward of the tire radial-direction D2 in a tapered manner.

Each of the bead portions 11 includes a rim strip rubber 11d placed on an outer side in the tire width-direction D1 than the carcass layer 14 to configure an outer surface which comes into contact with the rim. Each of the sidewall portions 12 includes a sidewall rubber 12a which is placed on an outer side in the tire width-direction D1 than the carcass layer 14 to configure an outer surface.

The tread portion 13 includes a tread rubber 13b. An outer surface of the tread rubber 13b configures the tread surface 13a. The tread portion 13 also includes a belt portion 13c placed between the tread rubber 13b and the carcass layer 14. The belt portion 13c includes a plurality of (four in FIG. 1) belt plies 13d. For example, each of the belt plies 13d includes a plurality of belt cords (organic fiber or metal, for example) which are arranged in parallel, and topping rubbers for coating the belt cords.

The carcass layer 14 is composed of at least one (two in FIG. 1) carcass plies 14a. Each of the carcass plies 14a is folded back around the bead 11a to surround the bead 11a. Each of the carcass plies 14a includes a plurality of ply cords (organic fiber or metal, for example) which are arranged in a direction intersecting with the tire circumferential-direction D3 substantially at right angles, and topping rubbers for coating the ply cords.

To maintain the air pressure, the inner linear 15 has an excellent function to prevent gas from passing through the inner linear 15. In the sidewall portion 12, the inner linear 15 is in intimate contact with an inner periphery of the carcass layer 14, and no other material is interposed between the inner linear 15 and the carcass layer 14.

For example, in a distance between the carcass ply 14a which is placed on the innermost side and a tire inner peripheral surface (inner peripheral surface of inner linear 15), the distance of the sidewall portion 12 is 90% to 180% of the distance of the tread portion 13. More specifically, the distance of the sidewall portion 12 is 120% to 160% of the distance of the tread portion 13.

An outer surface of the sidewall portion 12 has a position 12b which becomes the same, in the tire radial-direction D2, as the tire maximum position (more specifically, maximum distance position of distance of carcass layer 14 between outer sides in tire width-direction D1). The position 12b is called a tire maximum width position 12b, hereinafter.

The outer surface of the sidewall portions 12 has a position 12c which becomes the same, in the tire radial-direction D2, as an outer end 11e of the bead filler 11c in the tire radial-direction D2. The position 12c is called a bead filler outer end position 12c, hereinafter.

Further, the outer surface of the sidewall portions 12 has a position 12d which becomes the same, in the tire radial-direction D2, as a central position between the outer edge 11f of the bead core 11b in the tire radial-direction D2 and the inner end 13e of the belt portion 13c in the tire radial-direction D2. The position 12d is called a central position 12d, hereinafter.

Figure 3:
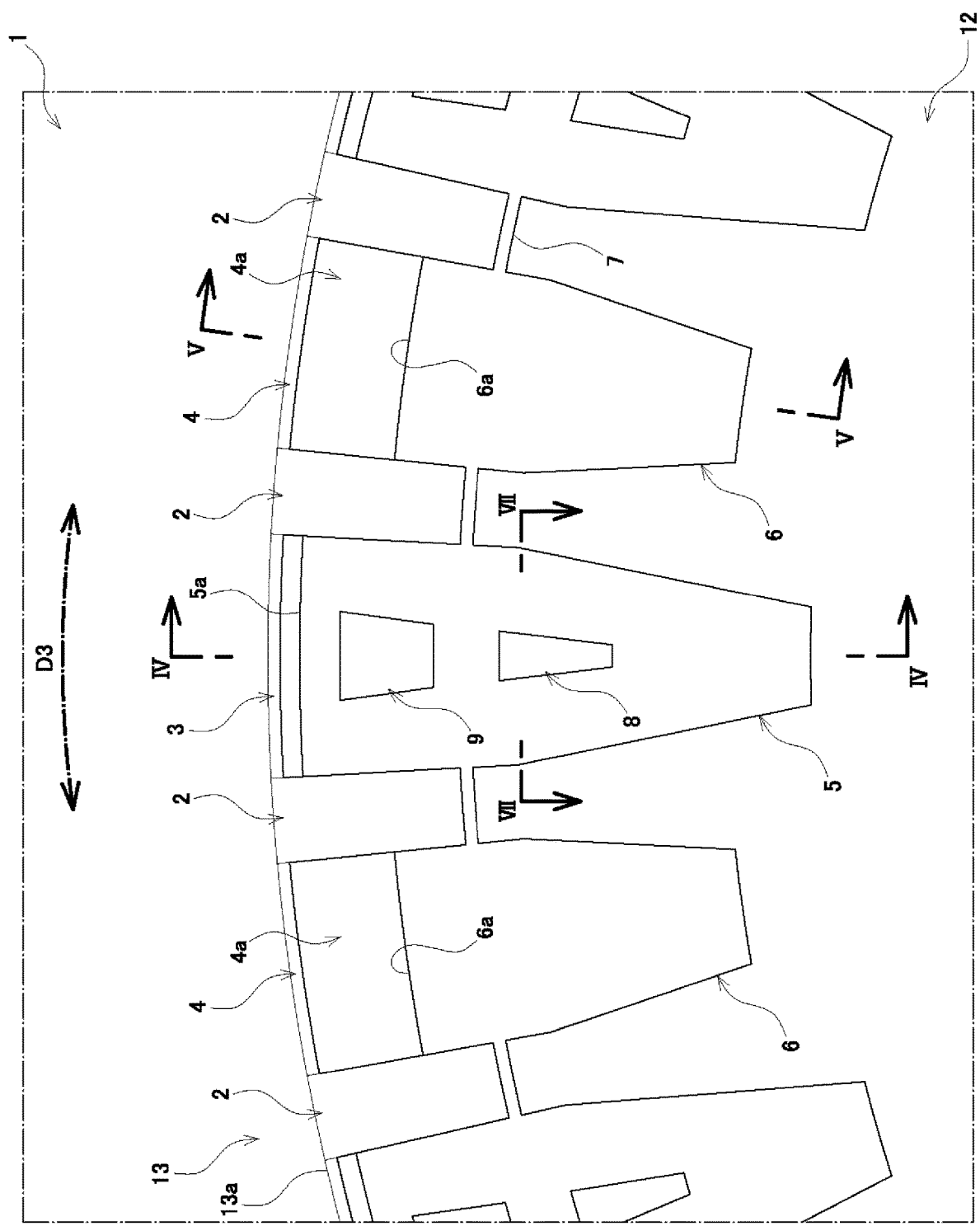
FIG. 3 is a side view of essential portions (perspective view in tire width-direction) of the pneumatic tire of the embodiment.
Figure 4:
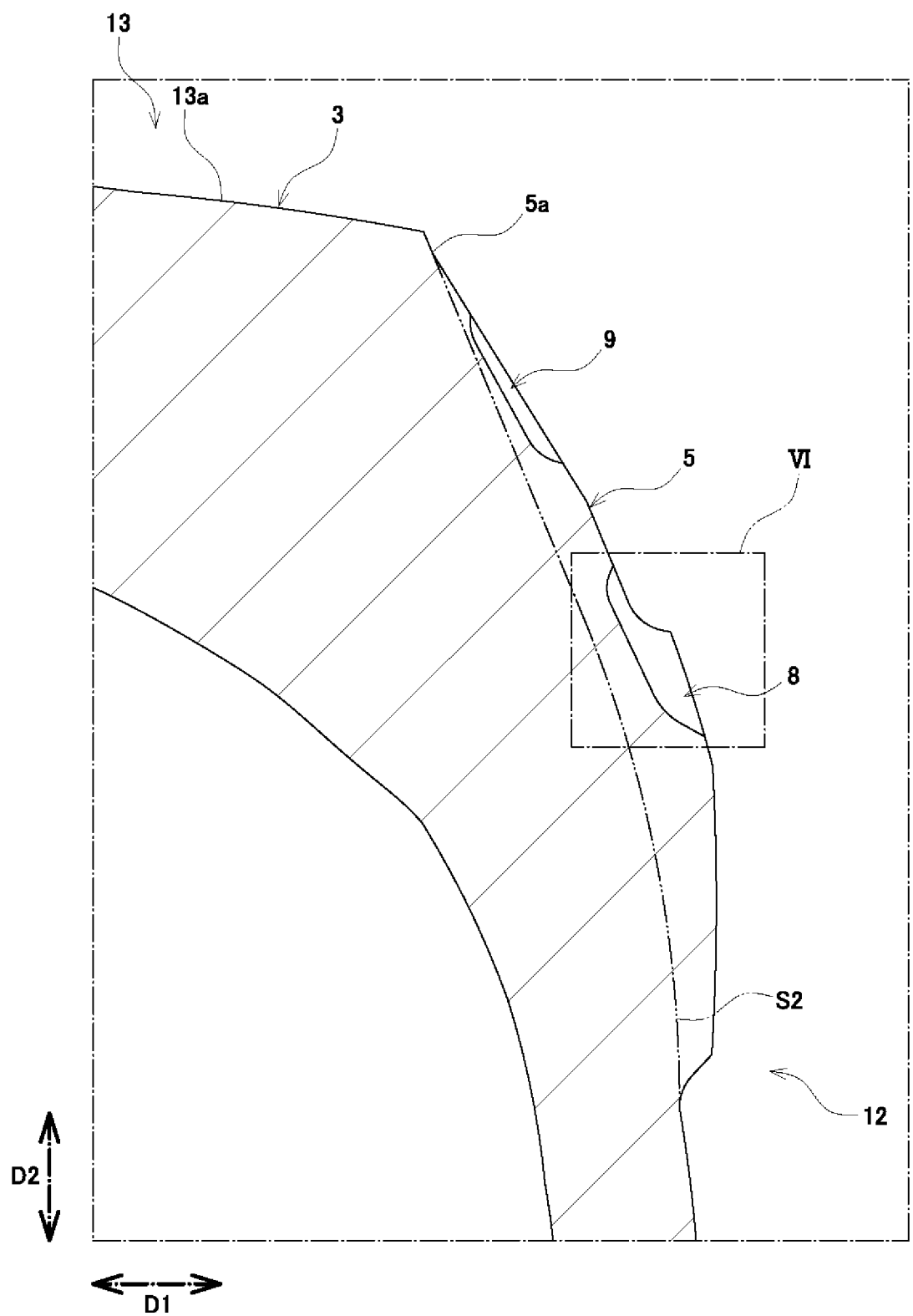
FIG. 4 is an enlarged sectional view of essential portions taken along line IV-IV in FIG. 3.
Figure 5:
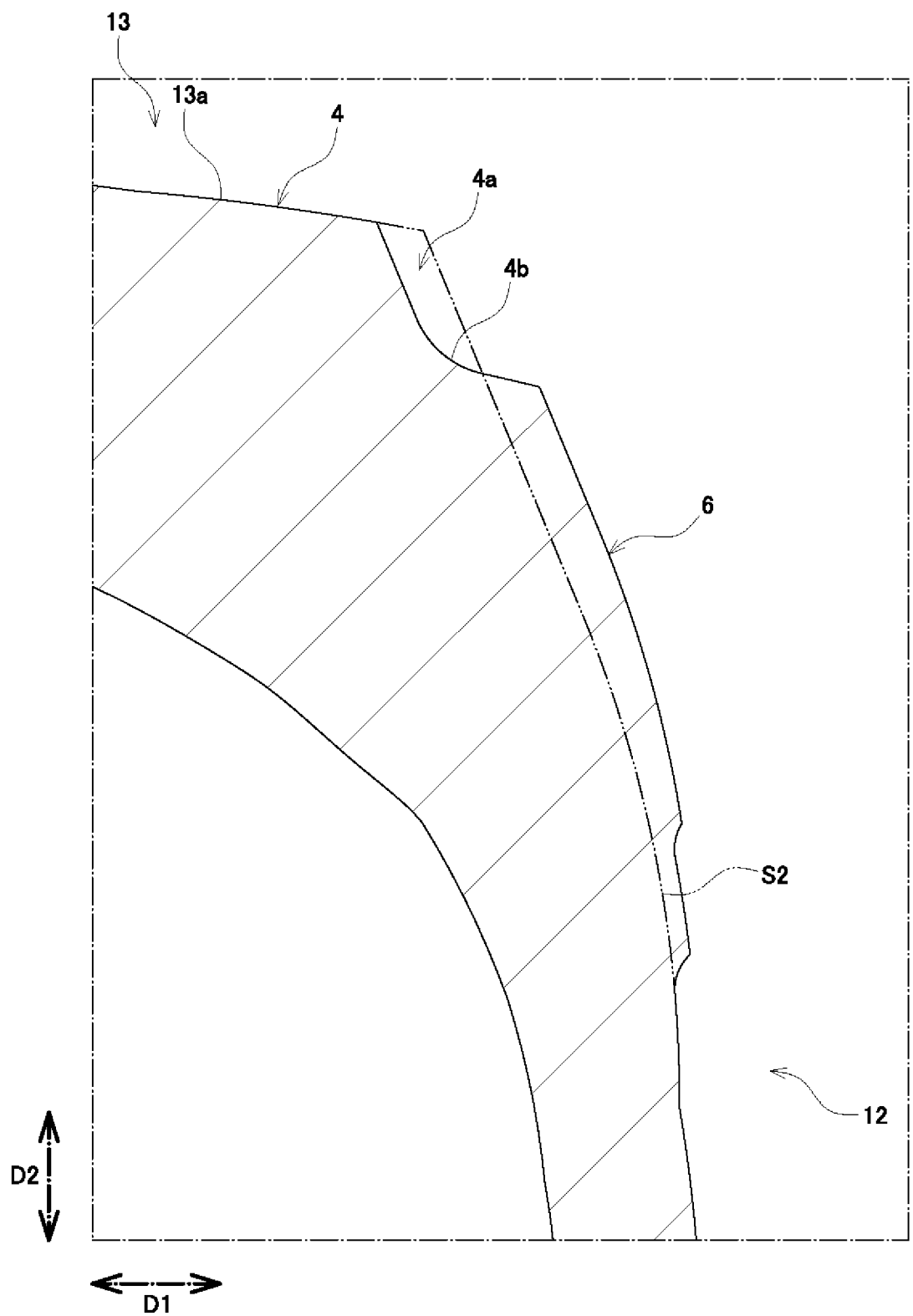
FIG. 5 is an enlarged sectional view of essential portions taken along line V-V in FIG. 3.

As shown in FIGS. 2 to 5, the tread portion 13 includes a plurality of grooves 2 extending outer end in the tire width-direction D1, and a plurality of blocks 3 and 4 which are defined by the plurality of groves 2 and arranged in the tire circumferential-direction D3. In FIGS. 4 and 5, dashed-two dotted lines show profile surfaces (reference surfaces) S2 of the tire 1.

The plurality of blocks 3 and 4 include a plurality of first blocks 3 and a plurality of second blocks 4 having recesses 4a, which are recesses with respect to a profile surface S2, at an outer end in the tire width-direction D1. An outer end edge of the second block 4 on the tread surface 13a in the tire width-direction D1 is located on an inner side in the tire width-direction D1 than the outer end edge of the first block 3 on the tread surface 13a in the tire width-direction D1. Accordingly, the outer end edge of the tread surface 13a in the tire width-direction D1 is formed uneven as viewed in the tire radial-direction D2.

Since the uneven shapes exist, components of the surfaces and the edges are formed. Since the uneven shapes are formed on the portions of the tire which come into contact with dirt, sand and rock, areas which come into contact with the dirt, sand and rock become large, and surfaces and edges formed by the uneven shapes easily come into contact with the dirt, sand and rock of various positions. Since the uneven shapes are formed in the portions which come into contact with the dirt, sand and rock, traction performance is enhanced.

In the embodiment, the first blocks 3 and the second blocks 4 are placed alternately in the tire circumferential-direction D3. That is, blocks which are adjacent with the first blocks 3 in the tire circumferential-direction D3 are the second blocks 4, and blocks which are adjacent with the second blocks 4 in the tire circumferential-direction D3 are the first blocks 3.

The sidewall portion 12 includes a plurality of projecting portions 5 and 6 which project from the profile surface S2 in the tire width-direction D1. The sidewall portion 12 includes an annular protrusion portion 7 which projects from the profile surface S2 in the tire width-direction D1 and extends along the tire circumferential-direction D3.

The projecting portions 5 and 6 are placed outward of the sidewall portion 12 at least in the tire radial-direction D2. Accordingly, the projecting portions 5 and 6 can come into contact with mud and sand in a state where the tire 1 sinks due to a weight of the vehicle in a mud area and a sand area, and can also come into contact with the uneven rocks in a rocky area. That is, the projecting portions 5 and 6 come into contact with the ground in bad roads such as a mud area, a sand area and a rocky area. The projecting portions 5 and 6 do not normally come into contact with the ground in a flat road.

The projecting portions 5 and 6 are located on an outer side in the tire radial-direction D2 than the bead filler outer end position 12c (see FIG. 1) of the sidewall portion 12. More specifically, the projecting portions 5 and 6 are placed on the outer side in the tire radial-direction D2 than the tire maximum width position 12b (see FIG. 1) of the sidewall portion 12.

As shown in FIG. 3, the plurality of projecting portions 5 and 6 include a plurality of first projecting portions 5. At least portions of the first projecting portions 5 are interposed on the first block 3 in the tire radial-direction D2 as viewed in the tire width-direction D1. The projecting portions 5 and 6 also include a plurality of second projecting portions 6. At least portions of the second projecting portions 6 are interposed on the second block 4 in the tire radial-direction D2. For example, the projecting portions 5 and 6 are superposed on the blocks 3 and 4 by 25% or more in the tire circumferential-direction D3 (preferably 50% or more, and more preferably 75% or more) as viewed in the tire width-direction D1.

As viewed in the tire width-direction D1, the first projecting portions 5 are superposed only on the first blocks 3 in the tire radial-direction D2, and the second projecting portions 6 are superposed only on the second blocks 4 in the tire radial-direction D2. That is, the projecting portions 5 and 6 are superposed only on one of the blocks 3 and 4 in the tire radial-direction D2 as viewed in the tire width-direction D1.

The first projecting portions 5 and the second projecting portions 6 are separated from each other in the tire circumferential-direction D3. In the embodiment, the first projecting portions 5 and the second projecting portions 6 are alternately placed in the tire circumferential-direction D3. That is, a projecting portion which is adjacent with the first projecting portion 5 in the tire circumferential-direction D3 is the second projecting portion 6, and a projecting portion which is adjacent with the second projecting portion 6 in the tire circumferential-direction D3 is the first projecting portion 5.

An outer end 5a of the first projecting portion 5 in the tire radial-direction D2 is located on an inner side in the tire radial-direction D2 than the tread surface 13a of the first block 3. Accordingly, uneven shapes are formed by the tread surface 13a of the first block 3 and the outer end 5a of the first projecting portion 5 in the tire radial-direction D2. Therefore, traction performance can be enhanced.

An outer end 6a of the second projecting portion 6 in the tire radial-direction D2 is located at the same position as a bottom surface 4b of the recess 4a of the second block 4 in the tire radial-direction D2. Accordingly, a surface which is recessed from the tread surface 13a of the second block 4 (surface configured by the bottom surface 4b of the recess 4a and the outer end 6a of the second projecting portion 6) becomes large. Therefore, traction performance can be enhanced.

Each of the first projecting portions 5 includes openings 8 and 9. Accordingly, a weight is increased due to existence of the first projecting portion 5, and weights of the openings 8 and 9 are prevented from increasing. Therefore, weight balance which may be caused by the existence of the first projecting portion 5 is restrained from becoming uniform. Due to the existence of the openings 8 and 9, components of the surfaces and the edges increase, and thus traction performance is enhanced.

The openings 8 and 9 are separated from both end edges of the first projecting portion 5 in the tire radial-direction D2. Further, the openings 8 and 9 are separated from the both end edges of the first projecting portion 5 in the tire circumferential-direction D3. Accordingly, since rigidity around the openings 8 and 9 of the first projecting portion 5 can be enhanced, traction performance by the first projecting portion 5 can be maintained. For example, a distance between the opening edges of the openings 8 and 9 and the end edge of the first projecting portion 5 is 1.5 mm or more (preferably, 2.0 mm or more).

Center positions of the openings 8 and 9 in the tire circumferential-direction D3 match with center positions of the first projecting portions 5 in the tire circumferential-direction D3. The openings 8 and 9 are line-symmetric with respect to the center of the first projecting portion 5 in the tire circumferential-direction D3.

Each of the first projecting portions 5 includes the two openings 8 and 9. More specifically, the first projecting portion 5 includes the first opening 8 located on an inner side in the tire radial-direction D2, and the second opening 9 located on the outer side in the tire radial-direction D2. The first opening 8 is located on the inner side in the tire radial-direction D2 than the annular protrusion portion 7, and the second opening 9 is located on the outer side in the tire radial-direction D2 than the annular protrusion portion 7.

A projecting amount (maximum projecting amount) of the first projecting portion 5 in the tire width-direction D1 is larger than a projecting amount (maximum projecting amount) of the second projecting portion 6 in the tire width-direction D1. On the other hand, the openings 8 and 9 are formed only in the first projecting portion 5 and are not formed in the second projecting portion 6. Therefore, it is possible to suppress the unevenness of the weight balance which may be caused by a difference between the projecting amounts of the first projecting portion 5 and the second projecting portion 6.

The first opening 8 is located at a position of a portion of the first projecting portion 5 which most projects in the tire width-direction D1. Accordingly, the first opening 8 is provided at a portion of the first projecting portion 5 which has the largest volume. Therefore, it is possible to suppress the unevenness of the weight balance which may be caused by the existence of the first projecting portion 5.

A specific configuration of the openings 8 and 9 will be described with reference to FIGS. 6 and 7. The specific configuration of the first opening 8 will be described below but the configuration of the second opening 9 is substantially the same as that of the first opening 8.

Figure 6:
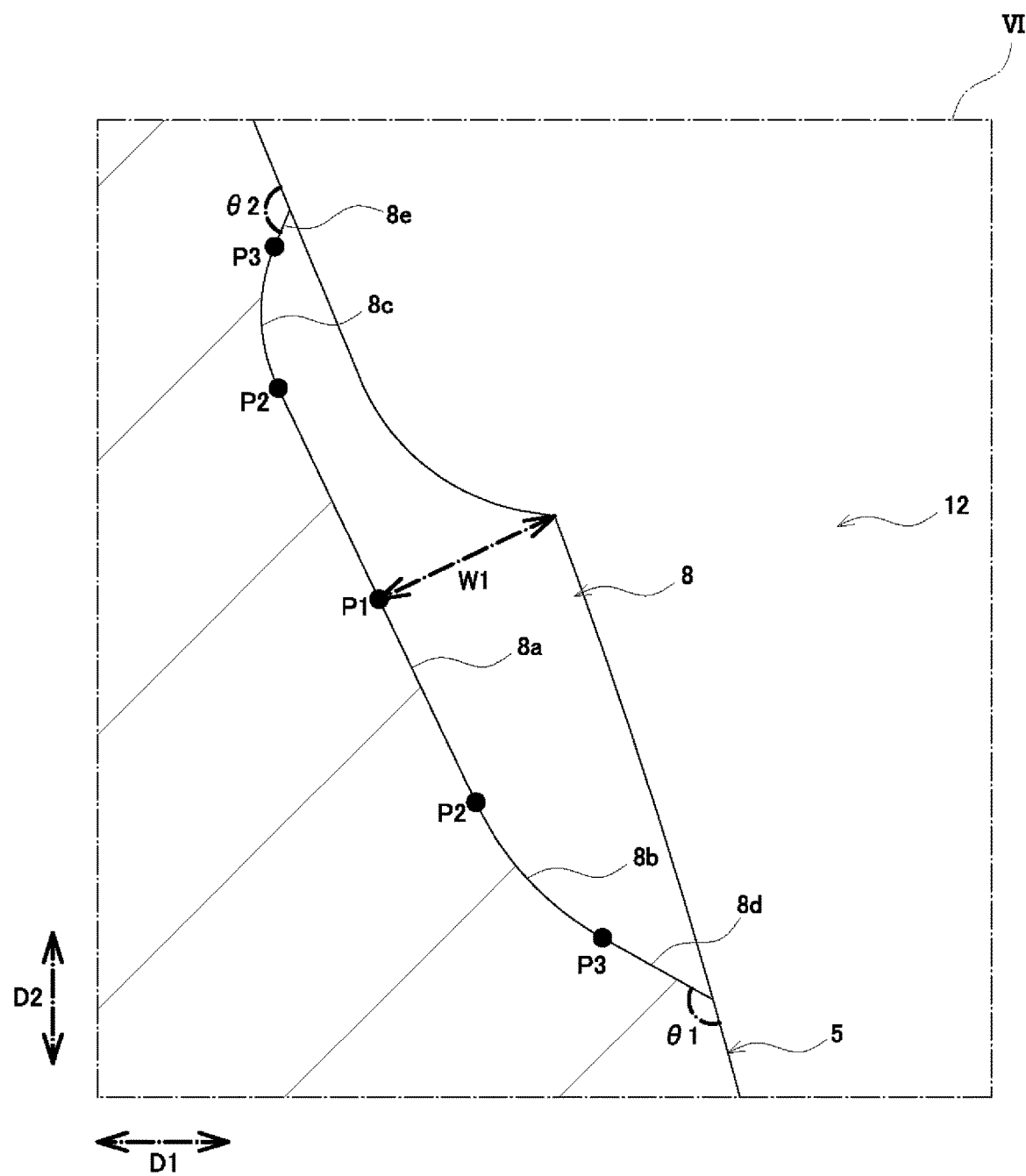
FIG. 6 is an enlarged view of a region VI in FIG. 4.

As shown in FIG. 6, the first opening 8 includes a bottom flat surface 8a which is formed into a flat surface. The first opening 8 includes a pair of radial bottom curved surfaces 8b and 8c placed on both sides of the bottom flat surface 8a in the tire radial-direction D2, and a pair of radial side flat surfaces 8d and 8e placed between the end edge of the first opening 8 in the tire radial-direction D2 and the radial bottom curved surfaces 8b and 8c.

In FIG. 6 (also in FIGS. 7 to 9), a point P1 shows a maximum depth position of the first opening 8. In FIG. 6 (also in FIGS. 8 and 9), points P2 show boundaries between the bottom flat surface 8a and the radial bottom curved surfaces 8b and 8c, and points P3 show boundaries between the radial bottom curved surfaces 8b and 8c and the radial side flat surfaces 8d and 8e.

The radial bottom curved surfaces 8b and 8c are formed into arc shapes having cross sections at surfaces extending along the tire radial-direction D2 (tire meridional plane). The radial side flat surfaces 8d and 8e are formed into flat surfaces. Of the pair of radial bottom curved surfaces 8b and 8c and radial side flat surfaces 8d and 8e, the radial bottom curved surface and the radial side flat surface located inner side in the tire radial-direction D2 are respectively called a first radial bottom curved surface 8b and a first radial side flat surface 8d, and the radial bottom curved surface and the radial side flat surface located outer side in the tire radial-direction D2 are respectively called a second radial bottom curved surface 8c and a second radial side plane surface 8e.

Radii of curvature of the radial bottom curved surfaces 8b and 8c are equal to or greater than a maximum depth size W1 of the first opening 8 (preferably greater than maximum depth size W1). For example, the radii of curvature of the radial bottom curved surfaces 8b and 8c are 100% to 200% of the maximum depth size W1 of the first opening 8, and more specifically, 100% to 175%. The radii of curvature of the radial bottom curved surfaces 8b and 8c are equal to or less than the maximum projecting amount of the first projecting portion 5.

Of the pair of radial bottom curved surfaces 8b and 8c, a radius of curvature of the first radial bottom curved surface 8b which is close to the central position 12d (see FIG. 1) of the sidewall portion 12 is greater than that of the second radial bottom curved surface 8c which is far from the central position 12d. For example, the radius of curvature of the radial bottom curved surface 8b which is close to the central position 12d is 150 to 200% of the radius of curvature of the second radial bottom curved surface 8c which is far from the central position 12d.

Of the pair of radial side flat surfaces 8d and 8e, a first angle θ1 formed between a surface of the first projecting portion 5 and the first radial side flat surface 8d which is close to the central position 12d of the sidewall portion 12 is greater than a second angle θ2 formed between the surface of the first projecting portion 5 and the second radial side flat surface 8e which is far from the central position 12d. For example, the first angle θ1 is 100 to 120% of the second angle θ2.

Figure 7:
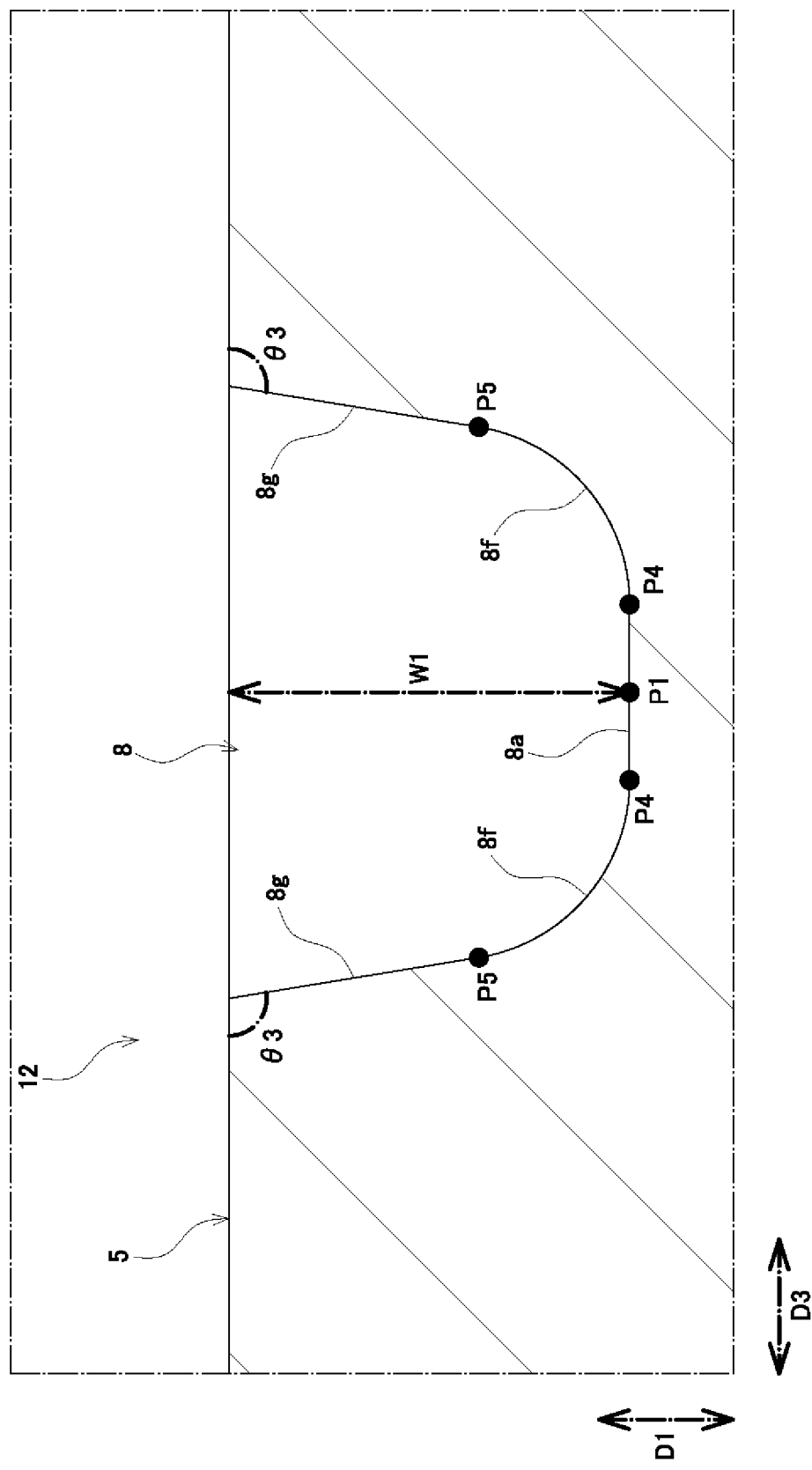
FIG. 7 is an enlarged sectional view of essential portions taken along line VII-VII in FIG. 3.

As shown in FIG. 7, the first opening 8 includes a pair of circumferential bottom curved surfaces 8f and 8f placed on both sides of the bottom flat surface 8a in the tire circumferential-direction D3, and a pair of circumferential side flat surfaces 8g and 8g placed between the end edge of the first opening 8 in the tire circumferential-direction D3 and the circumferential bottom curved surfaces 8f and 8f. In FIG. 7, points P4 show boundaries between the bottom flat surface 8a and the circumferential bottom curved surfaces 8f and 8f, and points P5 show boundaries between the circumferential bottom curved surfaces 8f and 8f and the circumferential side flat surfaces 8g and 8g.

A cross section of the circumferential bottom curved surface 8f is formed into an arc shape extending along the tire circumferential-direction D3, and a cross section of the circumferential side flat surface 8g is formed into a flat shape. A radius of curvature of the circumferential bottom curved surface 8f is equal to or greater than the maximum depth size W1 (preferably greater than maximum depth size W1) of the first opening 8. For example, the radius of curvature of the circumferential bottom curved surface 8f is 100% to 150% of the maximum depth size W1 of the first opening 8 and more specifically, 110% to 140%. The radius of curvature of the circumferential bottom curved surface 8f is equal or less than the maximum projecting amount of the first projecting portion 5.

The radii of curvature of the radial bottom curved surfaces 8b and 8c are greater than the radius of curvature of the circumferential bottom curved surface 8f. For example, radii of curvature of the radial bottom curved surfaces 8b and 8c are 200% to 350% of the radius of curvature of the circumferential bottom curved surface 8f, and more specifically, 250% to 300%.

The angles θ1 and θ2 formed between the radial side flat surfaces 8d and 8e and the surface of the first projecting portion 5 is greater than an angle θ3 formed between the circumferential side flat surface 8g and the surface of the first projecting portion 5. For example, the angles θ1 and θ2 formed between the radial side flat surfaces 8d and 8e and the surface of the first projecting portion 5 is 90° to 135°, and the angle θ3 formed between the circumferential side flat surface 8g and the surface of the first projecting portion 5 is 90° to 105°.

As described above, the pneumatic tire 1 of the embodiment include a sidewall portion 12 extending in a tire radial-direction D2, and a tread portion 13 having a tread surface 13a on outer side in the tire radial-direction D2 and connected to an outer end of the sidewall portion 12 in the tire radial-direction D2. The tread portion 13 includes a plurality of grooves 2 extending to an outer end in a tire width-direction D1, and a plurality of blocks 3 and 4 arranged in a tire circumferential-direction D3 by being defined the blocks 3 and 4 by the plurality of grooves 2. The plurality of blocks 3 and 4 includes a plurality of first blocks 3 and a plurality of second blocks 4, outer end edges of the second blocks 4 on the tread surface 13a in the tire width-direction D1 being located on an inner side in the tire width-direction D1 than outer end edges of the first blocks 3 on the tread surface 13a in the tire width-direction D1 due to recesses 4a provided at outer ends of the second blocks 4 in the tire width-direction D1. The sidewall portion 12 includes a plurality of projecting portions 5 projecting in the tire width-direction D1. The projecting portions 5 are placed such that at least portions of the projecting portions 5 are superposed on the first block 3 in the tire radial-direction D2 as viewed in the tire width-direction D1. At least one of the projecting portions 5 (both in the embodiment) includes an openings 8 and 9 which are separated from at least one of end edges of the projecting portions 5 in the tire radial-direction D2. The openings 8 and 9 include radial bottom curved surfaces 8b and 8c having an arc cross section extending along the tire radial-direction D2. A radius of curvature of the radial bottom curved surfaces 8b and 8c are equal to or greater than a maximum depth size W1 of the opening 8.

According to the above-described configuration, since the outer end of the second block 4 includes the recess 4a in the outer tire width-direction D1, the outer end edge of the tread surface 13a of the second block 4 in the tire width-direction D1 is located on the inner side in the tire width-direction D1 than that of the first block 3 in the tire width-direction D1. Therefore, since positions of the outer end edges of the first block 3 and the second block 4 are different from each other, the uneven shape exhibits the traction performance.

The outer end of the second block 4 in the tire width-direction D1 has the recess 4a. Accordingly, at the position of the second block 4, the traction performance is exhibited by the uneven shape of the second block 4 itself.

At the position of the first block 3, the projecting portion 5 is at least partially superposed on the first block 3 in the tire radial-direction D2 as viewed in the tire width-direction D1. Therefore, the traction performance is exhibited by a positional relation (uneven shape, for example) of the first block 3 and the projecting portion 5.

Due to the existence of the projecting portion 5, the rubber weight of that portion becomes large. Hence, at least one of the projecting portions 5 includes the openings 8 and 9 which are separated from at least one of the end edges (both in the embodiment) of the projecting portion 5 in the tire circumferential-direction D3. Accordingly, it is possible to suppress the unevenness of the weight balance which may be caused by the existence of the projecting portion 5. Further, traction performance is exhibited by the surfaces and the edges of the openings 8 and 9.

The tire 1 becomes deformed by weight of the vehicle when the vehicle runs, for example. According to this, the projecting portion 5 also becomes deformed (becomes deformed largely especially in the tire radial-direction D2). Hence, there is a possibility that fracture and chip are generated from the bottom surfaces of the openings 8 and 9, for example. Hence, the openings 8 and 9 include the radial bottom curved surfaces 8b and 8c having the arc cross sections extending along the tire radial-direction D2. According to this, stresses generated when the tire becomes deformed are dispersed by the radial bottom curved surfaces 8b and 8c, and it is possible to restrain fracture and chip from being generated by the radial bottom curved surfaces 8b and 8c.

Further, the radii of curvature of the radial bottom curved surfaces 8b and 8c are greater than the maximum depth size W1 of the opening 8. According to this, since stresses generated when the tire becomes deformed are effectively dispersed by the radial bottom curved surfaces 8b and 8c, it is possible to effectively restrain fracture and chip from being generated at the radial bottom curved surfaces 8b and 8c.

In the pneumatic tire 1 of the embodiment, the openings 8 and 9 are separated from at least one of the end edges (both in the embodiment) in the tire circumferential-direction D3.

The opening 8 and 9 include a circumferential bottom curved surface 8f having an arc cross section extending along the tire circumferential-direction D3. A radius of curvature of the circumferential bottom curved surface 8f is equal to or greater than the maximum depth size W1 of the opening 8.

According to the above-described configuration, the openings 8 and 9 are separated from at least one of the end edge (both in the embodiment) in the tire circumferential-direction D3. The openings 8 and 9 include the circumferential bottom curved surface 8f having the arc cross section extending along the tire circumferential-direction D3. According to this, since stresses generated when the tire becomes deformed are effectively dispersed by the circumferential bottom curved surface 8f, it is possible to effectively restrain fracture and chip from being generated at the circumferential bottom curved surface 8f.

Further, the radius of curvature of the circumferential bottom curved surface 8f is equal to or greater than the maximum depth size W1 of the opening 8. According to this, since the stresses generated when the tire becomes deformed are effectively dispersed by the circumferential bottom curved surface 8f, it is possible to effectively restrain fracture and chip from being generated at the circumferential bottom curved surface 8f.

In the pneumatic tire 1 of the embodiment, the radius of curvature of the radial bottom curved surfaces 8b and 8c are greater than that of the circumferential bottom curved surface 8f.

According to the above-described configuration, with respect to the tire 1 (projecting portion 5) which generally largely becomes deformed in the tire radial-direction D2 than the tire circumferential-direction D3, the radii of curvature of the radial bottom curved surfaces 8b and 8c are greater than the radius of curvature of the circumferential bottom curved surface 8f. According to this, although large stresses generated when the tire becomes deformed are applied to the radial bottom curved surfaces 8b and 8c, the stresses are sufficiently dispersed by the radial bottom curved surfaces 8b and 8c. In this manner, the radii of the curved surfaces 8b, 8c and 8f can be optimized.

In the pneumatic tire 1 of the embodiment, the opening 8 and 9 include a radial side flat surfaces 8d and 8e which are placed between the end edge of the openings 8 and 9 of the tire radial-direction D2 and the radial bottom curved surfaces 8b and 8c, and which is formed into a flat surface, and a circumferential side flat surface 8g which is placed between the end edge of the opening 8 in the tire circumferential-direction D3 and the circumferential bottom curved surface 8f, and which is formed into the flat surface. An angles θ1 and θ2 formed between the radial side flat surfaces 8d and 8e and a surface of the projecting portion 5 are greater than an angle θ3 formed between the circumferential side flat surface 8g and the surface of the projecting portion 5.

According to the above-described configuration, the radial side flat surfaces 8d and 8e are formed into the flat surfaces, and are placed between the radial bottom curved surfaces 8b and 8c and the end edge of the tire radial-direction D2. The circumferential side flat surface 8g is formed into the flat surfaces, and is placed between the circumferential bottom curved surface 8f and the end edge of the opening 8 in the tire circumferential-direction D3.

With respect to the tire 1 (projecting portion 5) which generally largely becomes deformed in the tire radial-direction D2 than the tire circumferential-direction D3, the angles θ1 and θ2 which are formed between the radial side flat surfaces 8d and 8e and the surface of the projecting portion 5 are greater than the angle θ3 formed between the circumferential side flat surface 8g and the surface of the projecting portion 5. According to this, large stresses generated when the tire becomes deformed are applied to the radial side flat surfaces 8d and 8e, but the stresses are sufficiently dispersed by the radial side flat surfaces 8d and 8e. In this manner, the flat surfaces 8d, 8e and 8g can optimize the angles θ1 to θ3 formed with respect to the surface of the projecting portion 5.

In the embodiment, pneumatic tire 1 further includes a bead portion 11 placed on an inner side of the sidewall portion 12 of the tire radial-direction D2. The bead portion 11 includes a bead core 11b placed on an inner side. The tread portion 13 includes a tread rubber 13b placed on an outer side in the tire radial-direction D2, and a belt portion 13c placed on an inner side of the tread rubber 13b in the tire radial-direction D2. The opening 8 and 9 are separated from both end edges of the projecting portion 5 in the tire radial-direction D2, thereby including the pair of radial bottom curved surfaces 8b and 8c. A radius of curvature of one 8b of the pair of radial bottom curved surfaces 8b and 8c which is close to the central position 12d between an outer end 11f of the bead core lib in the tire radial-direction D2 and an inner end 13e of the belt portion 13c in the tire radial-direction D2 is greater than that of the other one 8c of the pair of radial bottom curved surfaces 8b and 8c which is far from the central position 12d.

According to the above-described configuration, the openings 8 and 9 are separated from the both end edges of the projecting portion 5 in the tire radial-direction D2. According to this, the openings 8 and 9 include the pair of radial bottom curved surfaces 8b and 8c. Generally, when the tire 1 becomes deformed, it is prone to become deformed largely between the bead core lib and the belt portion 13c which are made of hard material. More specifically, the tire 1 is generally probe to become deformed most largely at the central position 12d between the outer end 11f of the bead core lib in the tire radial-direction D2 and the inner end 13e of the belt portion 13c in the tire radial-direction D2.

Of the pair of radial bottom curved surfaces 8b and 8c, the radius of curvature of the surface 8b which is close to the central position 12d is greater than the radius of curvature of the surface 8c which is far from the central position 12d. According to this, large stresses generated when the tire becomes deformed are applied to the radial bottom curved surface 8b which is close to the central position 12d, but the stresses are sufficiently dispersed by the radial bottom curved surface 8b. In this manner, the radii of curvature of the radial bottom curved surfaces 8b and 8c can be optimized.

The pneumatic tire is not limited to the configuration of the embodiment described above, and the effects are not limited to those described above. It goes without saying that the pneumatic tire can be variously modified without departing from the scope of the subject matter of the present invention. For example, the constituents, methods, and the like of various modified examples described below may be arbitrarily selected and employed as the constituents, methods, and the like of the embodiments described above, as a matter of course.

Figure 8:
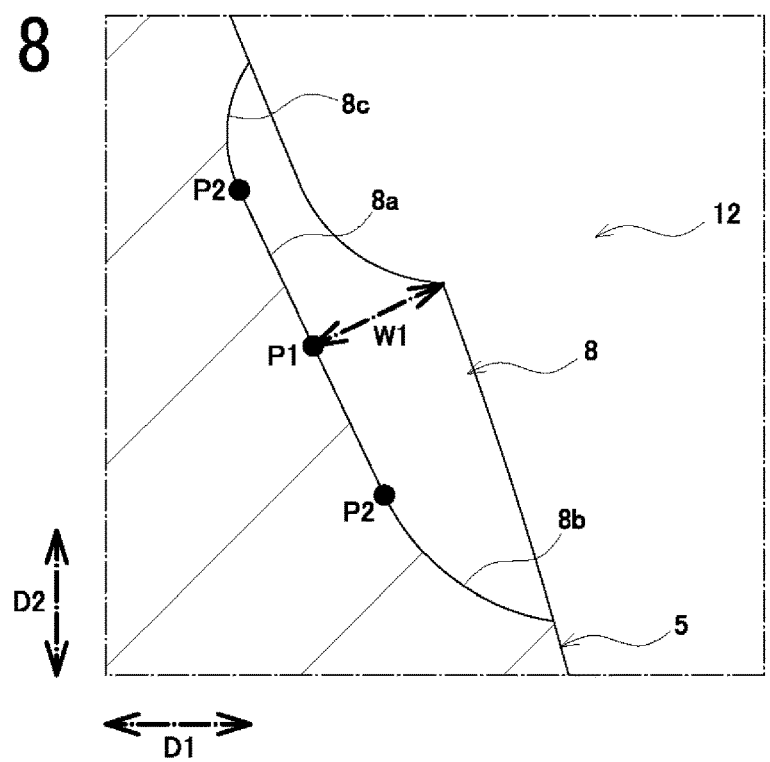
FIG. 8 is a sectional view of essential portions in a tire meridional surface of a pneumatic tire according to another embodiment.

In the pneumatic tire 1 of the embodiment, the opening 8 includes the bottom flat surface 8a, the radial bottom curved surfaces 8b and 8c, and the radial side flat surfaces 8d and 8e. However, the pneumatic tire is not limited to this configuration. For example, the opening 8 may include the bottom flat surface 8a and the radial bottom curved surfaces 8b and 8c and may not include the radial side flat surfaces 8d and 8e as shown in FIG. 8.

Figure 9:
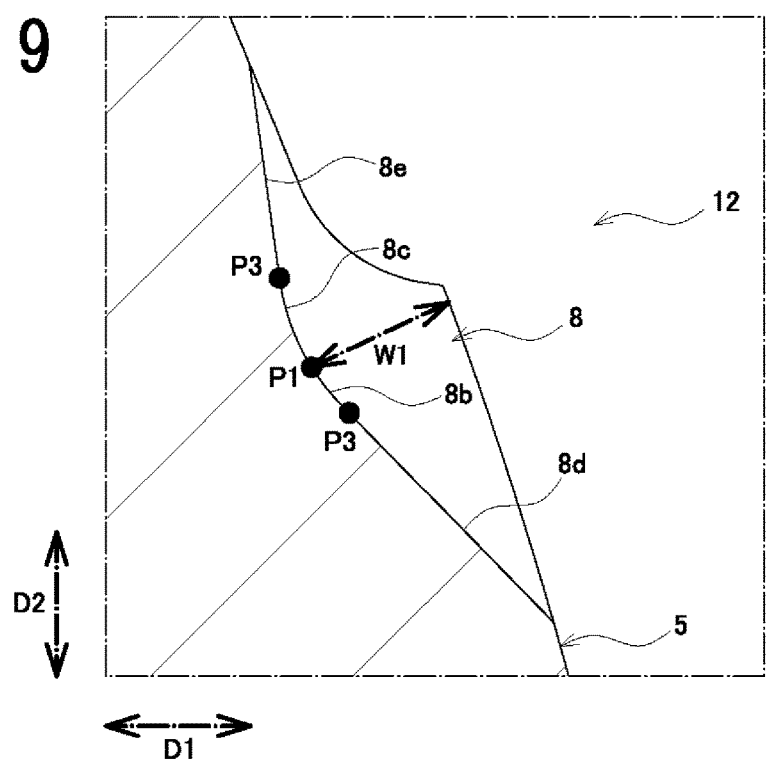
FIG. 9 is a sectional view of essential portions in a tire meridional surface of a pneumatic tire according to another embodiment.

As shown in FIG. 9 for example, the opening 8 may include the radial bottom curved surfaces 8b and 8c and the radial side flat surfaces 8d and 8e, and may not include the bottom flat surface 8a. Alternatively, the opening 8 may include the radial bottom curved surfaces 8b and 8c, and may not include the bottom flat surface 8a and the radial side flat surfaces 8d and 8e.

In the pneumatic tire 1 of the embodiment, the opening 8 includes the bottom flat surface 8a, the circumferential bottom curved surfaces 8f and 8f and the circumferential side flat surfaces 8g and 8g. However, the pneumatic tire is not limited to this configuration. For example, the opening 8 may include the bottom flat surface 8a and the circumferential bottom curved surfaces 8f and 8f, and may not include the circumferential side flat surfaces 8g and 8g.

For example, the opening 8 may include the circumferential bottom curved surfaces 8f and 8f and the circumferential side flat surfaces 8g and 8g, and may not include the bottom flat surface 8a. Alternatively, for example, the opening 8 may include the circumferential bottom curved surfaces 8f and 8f, and may not include the bottom flat surface 8a and the circumferential side flat surfaces 8g and 8g. Alternatively, for example, the opening 8 may include the bottom flat surface 8a and the circumferential side flat surfaces 8g and 8g, and may not include the circumferential bottom curved surfaces 8f and 8f.

In the pneumatic tire 1 of the embodiment, the openings 8 and 9 are separated from both the end edges of the projecting portion 5 in the tire radial-direction D2. However, the pneumatic tire is not limited to this configuration. The openings 8 and 9 may be separated only from one of the end edges of the projecting portion 5 in the tire radial-direction D2.

In the pneumatic tire 1 of the embodiment, the openings 8 and 9 are separated from both the end edges of the projecting portion 5 of the tire circumferential-direction D3. However, the pneumatic tire is not limited to this configuration. For example, the openings 8 and 9 may be separated only from one of the end edges of the projecting portion 5 in the tire circumferential-direction D3.

In the pneumatic tire 1 of the embodiment, the radius of curvature of the circumferential bottom curved surface 8f is equal to or greater than the maximum depth size W1 of the opening 8. However, the pneumatic tire is not limited to this configuration. For example, the radius of curvature of the circumferential bottom curved surface 8f may be smaller than the maximum depth size W1 of the opening 8.

In the pneumatic tire 1 of the embodiment, radii of curvature of the radial bottom curved surfaces 8b and 8c are greater than the radius of curvature of the circumferential bottom curved surface 8f. However, the pneumatic tire is not limited to this configuration. For example, the radii of curvature of the radial bottom curved surfaces 8b and 8c may be equal to or smaller than the radius of curvature of the circumferential bottom curved surface 8f.

In the pneumatic tire 1 of the embodiment, the angles θ1 and θ2 formed between the radial side flat surfaces 8d and 8e and the surface of the projecting portion 5 are greater than the angle θ3 formed between the circumferential side flat surface 8g and the surface of the projecting portion 5. However, the pneumatic tire is not limited to this configuration. For example, the angles θ1 and θ2 formed between the radial side flat surfaces 8d and 8e and the surface of the projecting portion 5 may be equal to or smaller than the angle θ3 formed between the circumferential side flat surface 8g and the surface of the projecting portion 5.

In the pneumatic tire 1 of the embodiment, the radius of curvature of the radial bottom curved surface 8b which is close to the central position 12d is greater than the radius of curvature of the radial bottom curved surface 8c which is far from the central position 12d. However, the pneumatic tire is not limited to this configuration. For example, the radius of curvature of the radial bottom curved surface 8b which is close to the central position 12d is equal to or smaller than the radius of curvature of the radial bottom curved surface 8c which is far from the central position 12d.

The pneumatic tire 1 of the embodiment includes not only the first projecting portion 5 but also the second projecting portion 6. However, the pneumatic tire is not limited to this configuration. For example, the pneumatic tire may include only the first projecting portion 5 and may not include the second projecting portion 6.

The pneumatic tire 1 of the embodiment has such a configuration that the first block 3 is not provided at its outer end in the tire width-direction D1 with the recess. However, the pneumatic tire is not limited to this configuration. For example, the first block 3 may be provided at its outer end in the tire width-direction D1 with a recess which is recessed with respect to the profile surface S2 only if the outer end edge of the second block 4 on the tread surface 13a in the tire width-direction D1 is located on the inner side in the tire width-direction D1 than the outer end edge of the first block 3 on the tread surface 13a in the tire width-direction D1.

The pneumatic tire 1 of the embodiment has such a configuration that the second projecting portion 6 does not have the opening. However, the pneumatic tire is not limited to this configuration. For example, the second projecting portion 6 may include the opening.

The pneumatic tire 1 of the embodiment has such a configuration that the openings 8 and 9 are provided in ½ of the plurality of projecting portions 5 and 6 (i.e., only first projecting portion 5). However, the pneumatic tire is not limited to this configuration. For example, the openings 8 and 9 may be provided only in one of the plurality of projecting portions 5 and 6. It is preferable that the openings 8 and 9 are provided at least in ¼ of the plurality of projecting portions 5 and 6, it is more preferable that the projecting portions 5 and 6 are provided at least in ⅓, and it is further more preferable that the projecting portions 5 and 6 are provided at least in ½.

The pneumatic tire 1 of the embodiment has such a configuration that all of the first projecting portions 5 have the same shapes and all of the second projecting portions 6 have the same shapes. However, the pneumatic tire is not limited to this configuration. For example, the first projecting portions 5 may have a plurality of different shapes, and they may be placed in sequence in the tire circumferential-direction D3. The second projecting portions 6 may have a plurality of different shapes, and they may be placed in sequence in the tire circumferential-direction D3.

The pneumatic tire 1 of the embodiment has such a configuration that the two openings 8 and 9 are provided in every one of the projecting portions 5. However, the pneumatic tire is not limited to this configuration. For example, one or three or more openings may be provided in every one of the projecting portions 5.

In the pneumatic tire 1 of the embodiment, the projecting portions 5 and 6 may be provided at least one of the pair of sidewall portions 12. For example, it is only necessary that the projecting portions 5 and 6 are provided at least in one of the sidewall portions 12 which is placed on the outer side when the pneumatic tire 1 is provided on the vehicle.

In the pneumatic tire 1, the projecting portions 5 and 6 are provided on both of the pair of sidewall portions 12, but the openings 8 and 9 may be provided in the projecting portion 5 of one of or both of the one sidewall portions 12. For example, the openings 8 and 9 may be provided at least in the projecting portion 5 of one of the sidewall portions 12 which is placed on the outer side when the pneumatic tire is mounted on the vehicle.

What is claimed is:

1. A pneumatic tire comprising:
a sidewall portion extending in a tire radial-direction; and
a tread portion having a tread surface on outer side in the tire radial-direction and connected to an outer end of the sidewall portion in the tire radial-direction, wherein
the tread portion includes a plurality of grooves extending to an outer end in a tire width-direction, and a plurality of blocks arranged in a tire circumferential-direction by being defined by the plurality of grooves,
the plurality of blocks includes a plurality of first blocks and a plurality of second blocks, outer end edges of the second blocks on the tread surface in the tire width-direction being located on an inner side in the tire width-direction than outer end edges of the first blocks on the tread surface in the tire width-direction due to recesses provided at outer ends of the second blocks in the tire width-direction,
the sidewall portion includes a plurality of projecting portions projecting in the tire width-direction,
the projecting portions are placed such that at least portions of the projecting portions are superposed on at least one of the first blocks in the tire radial-direction as viewed in the tire width-direction,
at least one of the projecting portions includes an opening which is separated from at least one of end edges of at least one of the projecting portions in the tire radial-direction,
the opening includes a radial bottom curved surface having an arc cross section extending along the tire radial-direction,
a radius of curvature of the radial bottom curved surface is equal to or greater than a maximum depth size of the opening,
the opening is separated from at least one of the end edges of at least one of the projecting portions in the tire circumferential-direction,
the opening includes a circumferential bottom curved surface having an arc cross section extending along the tire circumferential-direction,
a radius of curvature of the circumferential bottom curved surface is equal to or greater than the maximum depth size of the opening, and
the radius of curvature of the radial bottom curved surface is greater than that of the circumferential bottom curved surface.

2. The pneumatic tire according to claim 1, wherein the radius of curvature of the radial bottom curved surface is 100% to 200% of the maximum depth size of the opening.

3. The pneumatic tire according to claim 2, wherein the radius of curvature of the radial bottom curved surface is 100% to 175% of the maximum depth size of the opening.

4. The pneumatic tire according to claim 1, wherein a radius of curvature of the radial bottom curved surface is equal to or smaller than the maximum projecting amount of the at least one of the projecting portions.

5. The pneumatic tire according to claim 1, wherein a radius of curvature of the circumferential bottom curved surface is 100% to 150% of the maximum depth size of the opening.

6. The pneumatic tire according to claim 5, wherein a radius of curvature of the circumferential bottom curved surface is 110% to 140% of the maximum depth size of the opening.

7. The pneumatic tire according to claim 1 wherein the radius of curvature of the circumferential bottom curved surface is equal to or smaller than the maximum projecting amount of the at least one of the projecting portions.

8. The pneumatic tire according to claim 1, wherein the radius of curvature of the radial bottom curved surface is 200% to 350% of the radius of curvature of the circumferential bottom curved surface.

9. The pneumatic tire according to claim 1, wherein the radius of curvature of the radial bottom curved surface is 250% to 300% of the radius of curvature of the circumferential bottom curved surface.

10. A pneumatic tire comprising:
a sidewall portion extending in a tire radial-direction; and
a tread portion having a tread surface on outer side in the tire radial-direction and connected to an outer end of the sidewall portion in the tire radial-direction, wherein
the tread portion includes a plurality of grooves extending to an outer end in a tire width-direction, and a plurality of blocks arranged in a tire circumferential-direction by being defined by the plurality of grooves,
the plurality of blocks includes a plurality of first blocks and a plurality of second blocks, outer end edges of the second blocks on the tread surface in the tire width-direction being located on an inner side in the tire width-direction than outer end edges of the first blocks on the tread surface in the tire width-direction due to recesses provided at outer ends of the second blocks in the tire width-direction,
the sidewall portion includes a plurality of projecting portions projecting in the tire width-direction,
the projecting portions are placed such that at least portions of the projecting portions are superposed on at least one of the first blocks in the tire radial-direction as viewed in the tire width-direction,
at least one of the projecting portions includes an opening which is separated from at least one of end edges of at least one of the projecting portions in the tire radial-direction,
the opening includes a radial bottom curved surface having an arc cross section extending along the tire radial-direction,
a radius of curvature of the radial bottom curved surface is equal to or greater than a maximum depth size of the opening,
the opening is separated from at least one of the end edges of at least one of the projecting portions in the tire circumferential-direction,
the opening includes a circumferential bottom curved surface having an arc cross section extending along the tire circumferential-direction,
a radius of curvature of the circumferential bottom curved surface is equal to or greater than the maximum depth size of the opening,
the opening includes a radial side flat surface which is placed between an end edge of the opening in the tire radial-direction and the radial bottom curved surface and which is formed into a flat surface, and a circumferential side flat surface which is placed between an end edge of the opening in the tire circumferential-direction and the circumferential bottom curved surface and which is formed into the flat surface, and an angle formed between the radial side flat surface and a surface of the projecting portion is greater than an angle formed between the circumferential side flat surface and the surface of the projecting portion.

11. The pneumatic tire according to claim 10, wherein an angle formed between the radial side flat surface and a surface of the projecting portion is 90° to 135°, and an angle formed between the circumferential side flat surface and a surface of the projecting portion is 90° to 105°.

12. A pneumatic tire comprising:

a sidewall portion extending in a tire radial-direction; and a tread portion having a tread surface on outer side in the tire radial-direction and connected to an outer end of the sidewall portion in the tire radial-direction, wherein the tread portion includes a plurality of grooves extending to an outer end in a tire width-direction, and a plurality of blocks arranged in a tire circumferential-direction by being defined by the plurality of grooves, the plurality of blocks includes a plurality of first blocks and a plurality of second blocks, outer end edges of the second blocks on the tread surface in the tire width-direction being located on an inner side in the tire width-direction than outer end edges of the first blocks on the tread surface in the tire width-direction due to recesses provided at outer ends of the second blocks in the tire width-direction, the sidewall portion includes a plurality of projecting portions projecting in the tire width-direction, the projecting portions are placed such that at least portions of the projecting portions are superposed on at least one of the first blocks in the tire radial-direction as viewed in the tire width-direction, at least one of the projecting portions includes an opening which is separated from at least one of end edges of at least one of the projecting portions in the tire radial-direction, the opening includes a radial bottom curved surface having an arc cross section extending along the tire radial-direction, a radius of curvature of the radial bottom curved surface is equal to or greater than a maximum depth size of the opening, the pneumatic tire further comprises a bead portion placed on an inner side of the sidewall portion in the tire radial-direction, the bead portion includes a bead core placed on the inner side of the sidewall portion in the tire radial-direction, the tread portion includes a tread rubber placed on an outer side in the tire radial-direction, and a belt portion placed on an inner side of the tread rubber in the tire radial-direction, the opening is separated from both end edges of the projecting portion in the tire radial-direction, thereby including a pair of radial bottom curved surfaces including the radial bottom curved surface, and a radius of curvature of one of the pair of radial bottom curved surfaces, which is closer to the central position between an outer end of the bead core in the tire radial-direction and an inner end of the belt portion in the tire radial-direction than the other one of the pair of radial bottom curved surfaces which is far from the central position, is greater than that of the other one of the pair of radial bottom curved surfaces.

13. The pneumatic tire according to claim 12, wherein a radius of curvature of one of the radial bottom curved surfaces which is close to the central position is 150% to 200% of that of the other radial bottom curved surface which is far from the central position.

14. The pneumatic tire according to claim 12, wherein the opening includes a pair of radial side flat surfaces placed between an end edge of the opening in the tire radial-direction and the radial bottom curved surface, and an angle formed between the surface of the at least one of the projecting portions and one of the pair of radial side flat surfaces which is closer to the central position than the other one of the pair of radial side flat surfaces is equal to or greater than an angle formed between the surface of the at least one of the projecting portions and the other one of the radial side flat surfaces.

15. The pneumatic tire according to claim 14, wherein an angle formed between the surface of the at least one of the projecting portions and the one of the pair of radial side flat surfaces is 100% to 125% of an angle formed between the surface of the at least one of the projecting portions and the other one of the radial side flat surfaces.

* * * * *